United States Patent [19]
Koos et al.

[11] Patent Number: 5,413,941
[45] Date of Patent: May 9, 1995

[54] OPTICAL END POINT DETECTION METHODS IN SEMICONDUCTOR PLANARIZING POLISHING PROCESSES

[75] Inventors: Daniel A. Koos; Scott Meikle, both of Boise, Id.

[73] Assignee: Micron Technology, Inc., Boise, Id.

[21] Appl. No.: 178,663

[22] Filed: Jan. 6, 1994

[51] Int. Cl.⁶ .............................................. G01D 21/00
[52] U.S. Cl. ........................................ 437/8; 437/173
[58] Field of Search ............ 437/225, 8, 173, 228; 156/626, 627; 451/5, 8–10, 285, 286, 287, 290, 291

[56] References Cited

U.S. PATENT DOCUMENTS

| | | | |
|---|---|---|---|
| 5,131,752 | 7/1992 | Yu et al. | 356/369 |
| 5,209,813 | 5/1993 | Oshida et al. | 156/626 |
| 5,240,552 | 8/1993 | Yu et al. | 156/636 |
| 5,271,796 | 12/1993 | Miyashita et al. | 156/626 |

*Primary Examiner*—Robert Kunemund
*Assistant Examiner*—Matthew Whipple
*Attorney, Agent, or Firm*—Wells, St. John, Roberts, Gregory & Matkin

[57] ABSTRACT

A semiconductor processing method of detecting polishing end point from a polishing planarization process includes: a) impinging laser light onto an area of an outermost surface of a semiconductor substrate at an angle of incidence of at least 70° from a line normal relative to the substrate (at least 60° for s-polarized light), the impinged laser light predominantly reflecting off the area as opposed to transmitting therethrough; b) measuring intensity of the light reflected off the area; c) polishing the substrate outermost surface; d) repeating step "a" then step "b"; and e) comparing a prior measured intensity of reflected light with a later measured intensity of reflected light to determine a change in degree of planarity of the semiconductor substrate outermost surface as a result of polishing.

8 Claims, 7 Drawing Sheets

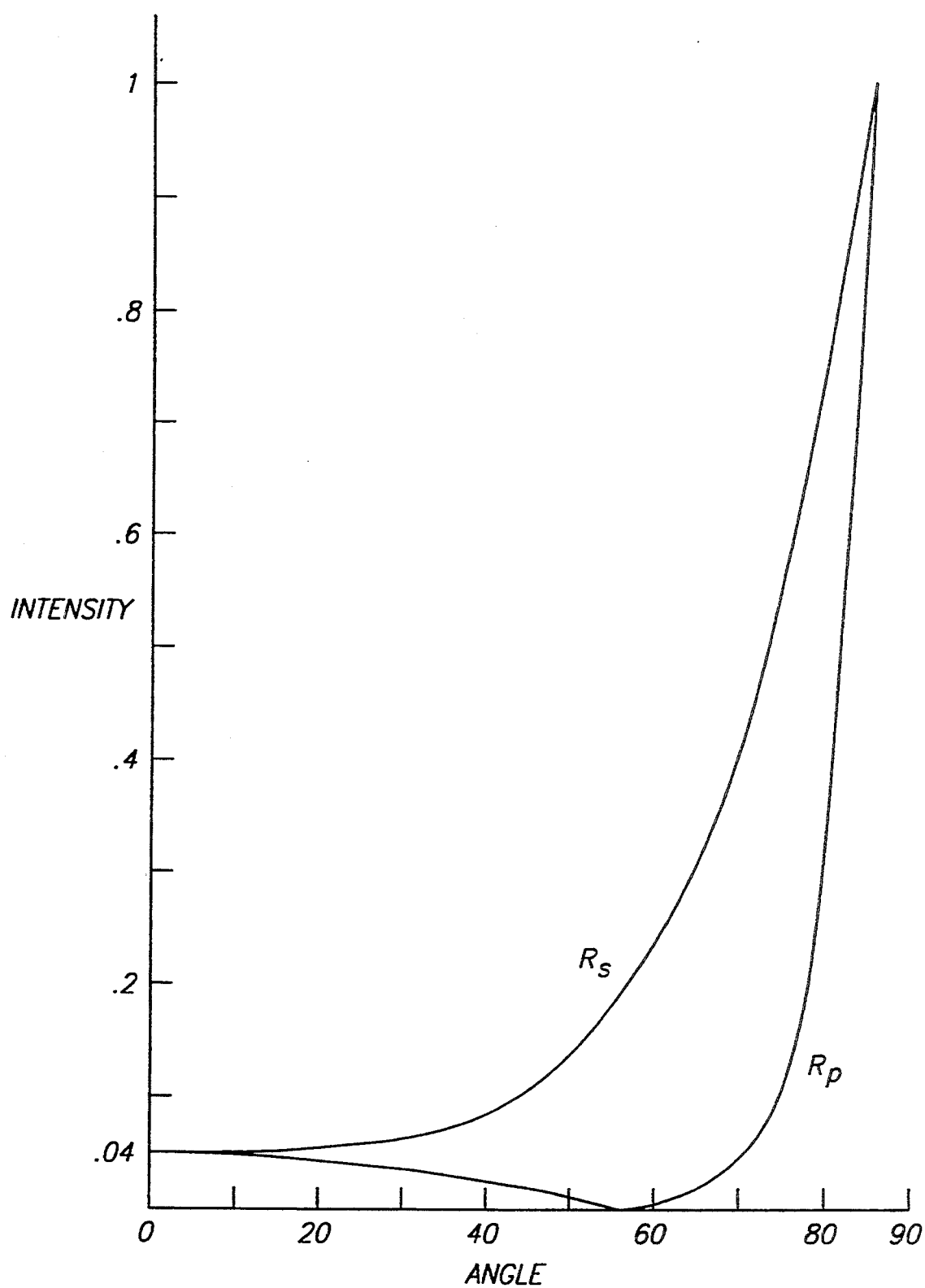

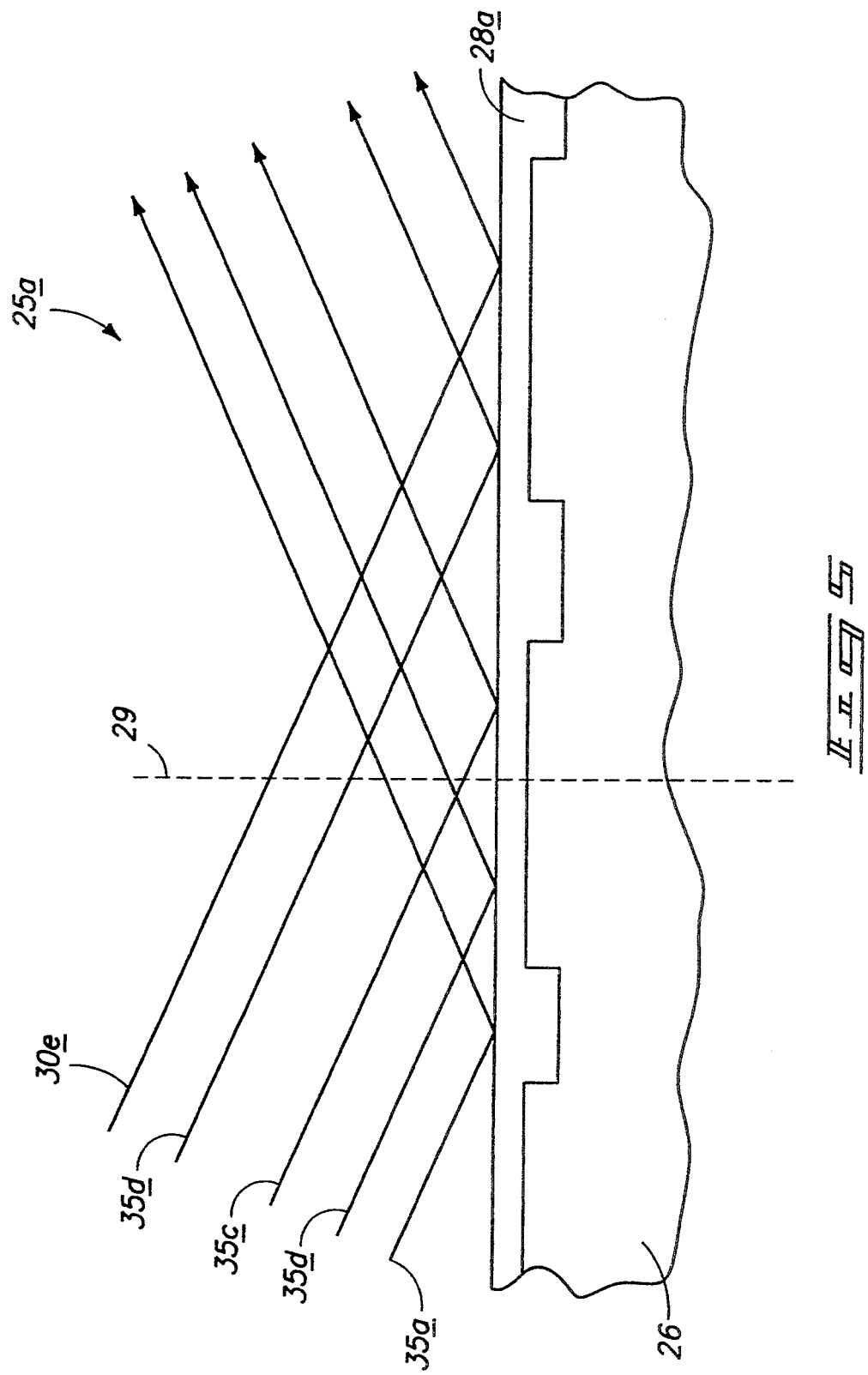

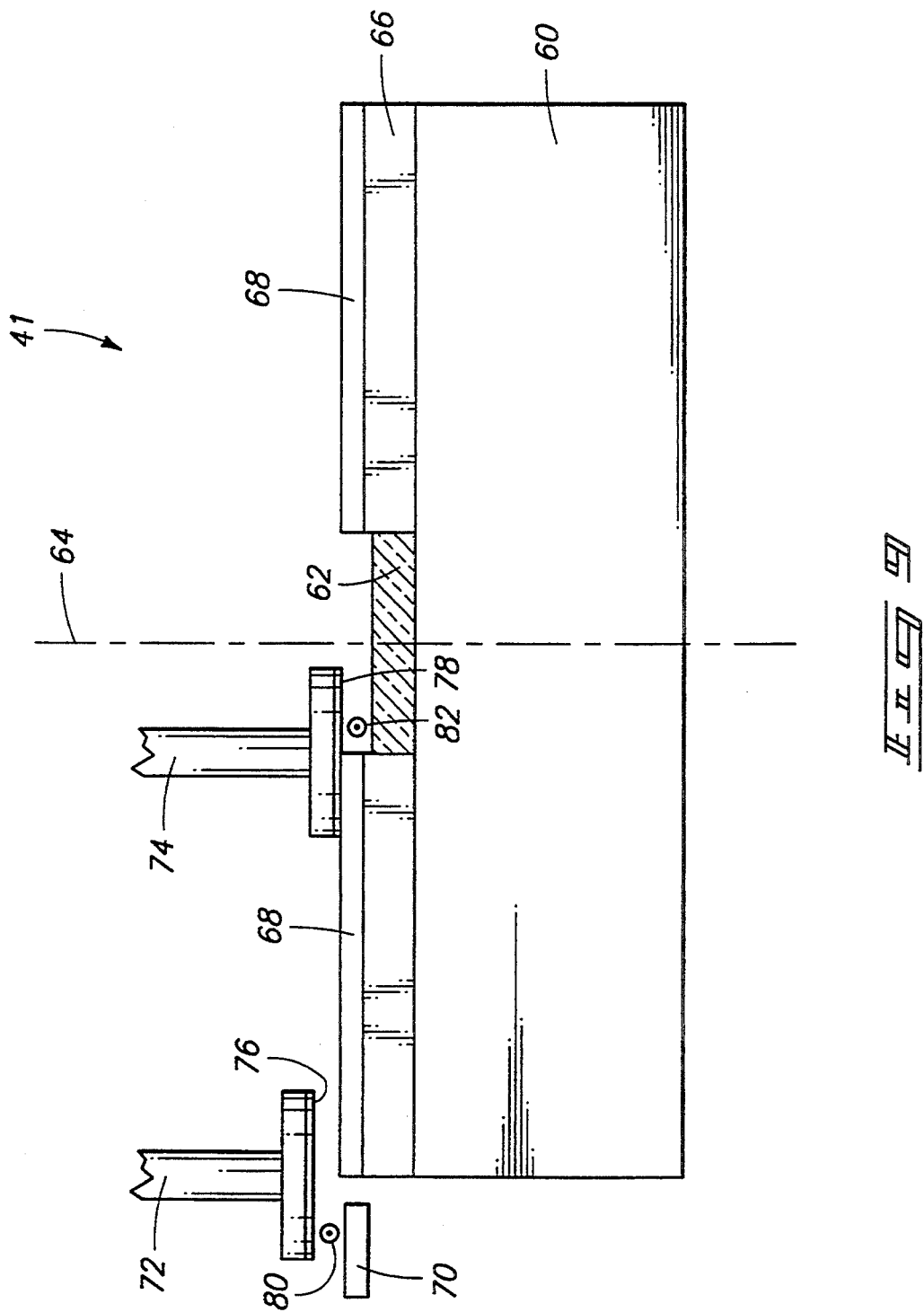

OPTICAL END POINT DETECTION METHODS IN SEMICONDUCTOR PLANARIZING POLISHING PROCESSES

TECHNICAL FIELD

This invention relates to optical end point detection methods in semiconductor planarizing polishing processes.

BACKGROUND OF THE INVENTION

In semiconductor manufacture, extremely small electronic devices are formed in separate dies in a thin, flat semiconductor wafer. In general, various materials which are either conductive, insulating, or semiconducting are utilized in the fabrication of integrated circuitry on semiconductor wafers. These materials are patterned, doped with impurities, or deposited in layers by various processes to form integrated circuits.

Increasing circuitry miniaturization and a corresponding increase in density has resulted in a high degree of varying topography being created on an outer wafer surface during fabrication. It is often necessary to polish a wafer surface having varying topography to provide a substantially planar surface. One such process is chemical-mechanical polishing. In general, this process involves holding and rotating a thin, flat wafer of the semiconductor material against a wetted polishing surface under controlled chemical, pressure, and temperature conditions. A chemical slurry containing a polishing agent, such as alumina or silica, is used as the abrasive medium. Additionally, the chemical slurry contains selected chemicals which etch various surfaces of the wafer during processing. The polishing effect on the wafer results in both a chemical and mechanical action.

A particular problem encountered in chemical-mechanical polishing is the determination that the surface has been planarized to a desired end point. It is often desirable, for example, to remove a thickness of oxide material which has been deposited onto a substrate, and on which a variety of integrated circuit devices have been formed. In removing or planarizing this oxide, it is desirable to remove the oxide to the top of the various integrated circuits devices without removing any portion of the devices. Typically, this planarization process is accomplished by control of the rotational speed, downward pressure, chemical slurry, and time of polishing.

The planar endpoint of a planarized surface is typically determined by removing the semiconductor wafer from the planarization apparatus and physically measuring the semiconductor wafer by techniques which ascertain dimensional and planar characteristics. If the semiconductor wafer does not meet specification, it must be loaded back into the planarization apparatus and further processed. Alternately, an excess of material may have been removed from the semiconductor wafer, rendering the part as substandard.

Certain techniques have been developed for in situ detection of chemical-mechanical planarization. Such are disclosed, by way of example, in our U.S. Pat. Nos. 5,036,015; 5,069,002; and 5,081,796. One such technique employs laser interferometry in situ to determine CMP end point. Such a technique employs maximizing of internal reflection or absorption of laser light into a light transmissive layer of material. The intensity of remaining light emanating outwardly through or from the upper surface is monitored. Thickness and planarity are determinable therefrom. Such is described in more detail with respect to FIGS. 1 and 2.

FIG. 1 diagrammatically illustrates a semiconductor wafer 10 comprised of a bulk substrate 12 and an overlying, unpolished upper silicon dioxide layer 14 having uneven topography. Incident laser light rays indicated by numerals 16a, 16b, 16c and 16d impinge and refract through upper layer 14, and bounce off of substrate layer 12 and outwardly of layer 14 as reflected light 20. As is apparent, reflected light 20 is modulated (changed) in comparison to the incident light 16.

Laser interferometry functions by seeking to attain substantial subsequent internal reflection of the laser light reflecting off of the substrate from the upper surface of the overlying layer and back onto the lower base substrate. Such phenomena is maximized when the thickness of the layer through which the incident laser light passes is approximately equal to an integer multiple of the wave length of the incident light. It is here where internal reflection, or absorption, of the light by the overlying layer is maximized. For example, assume the incident laser light rays 16a, 16b, 16c and 16d in FIG. 1 have an integer multiple wave length equal to the illustrated optical path within the least thick portions of overlying layer 14. As shown, incident rays 16a and 16c impinge on outer layer 14 in locations such that the first reflection off of the upper surface of substrate 12 results in additional reflection downward onto and off substrate 12 before escape from layer 14. On the other hand, incident rays 16b and 16d upon reflection off of substrate layer 12 reflect into thicker portions of layer 14 and immediately outwardly from such portions. Accordingly, collectively the incident light is modulated and useful information is determinable therefrom.

As the wafer becomes more planar, less light and lower intensity light is emitted from the outer layer. FIG. 2 illustrates the effect as planarity increases on wafer 10a. As is apparent, essentially all of the incident impinging light is internally reflected or absorbed. Accordingly, measurement of intensity as a function of time enables the operator to determine achievement of a desired thickness of layer 14a and correspondingly when substantial planarity is achieved.

Laser interferometry is not without some inherent drawbacks. First, such measures absolute intensity of light emitting from overlying substrate layer 14. Such would be impacted by the inherent degree of translusivity of the material of layer 14, and thus varies dependent upon the material 14 being polished. Second and correspondingly, laser interferometry is incapable of being utilized on opaque layers. Third, the fact that internal reflection or absorption of light occurs at any integer multiple of the incident wave length adds complexity. Specifically, the operator cannot directly tell whether the thickness being measured by the incident light is actually the desired finished thickness or some integer multiple thereof. To overcome such anomaly, the prior art utilizes multiple light wave lengths. From such collective information, both thickness and substantial planarity of a polished layer is determinable. Such does, however, require multiple light sources and further complexity in interpreting the detected light emanating from the substrate.

It would be desirable to develop improved methods of end point detection in chemical-mechanical polishing.

BRIEF DESCRIPTION OF THE DRAWINGS

Preferred embodiments of the invention are described below with reference to the following accompanying drawings.

FIG. 3 is a plot of intensity as a function of incident angle of S-polarized and P-polarized laser light.

FIG. 4 is a diagrammatic elevational view of a semiconductor wafer fragment analyzed in accordance with methods of the invention.

FIG. 5 is a diagrammatic elevational view of the FIG. 4 wafer being analyzed in accordance with a method after polishing to achieve a higher degree of planarity.

FIG. 9 is a diagrammatic cross-sectional view of a pair of semiconductor wafers being processed in an alternate method in accordance with the invention.

DETAILED DESCRIPTION OF THE PREFERRED EMBODIMENTS

Figure 1:
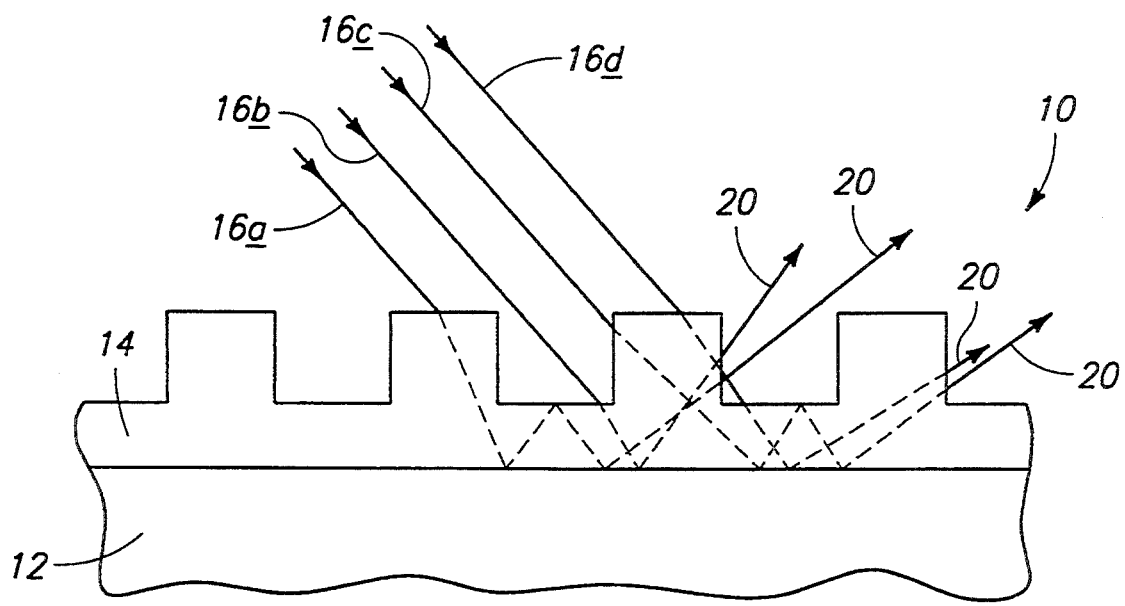
FIG. 1 is a diagrammatic side elevational view of a prior art method of measuring thickness of a semiconductor wafer fragment, and is discussed in the "Background" section above.
Figure 2:
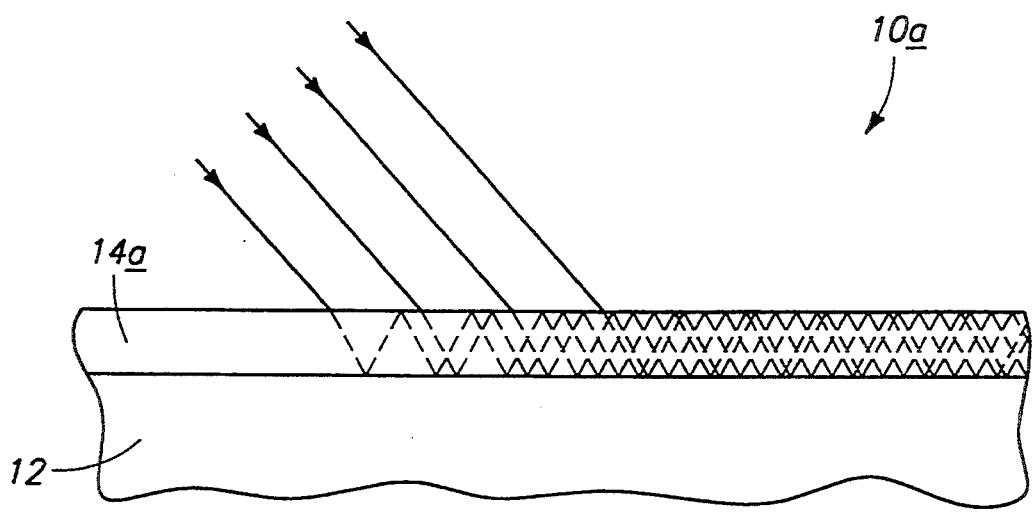
FIG. 2 is a diagrammatic side elevational view of the FIG. 1 wafer shown having a higher degree of planarity than that shown by FIG. 1.

This disclosure of the invention is submitted in furtherance of the constitutional purposes of the U.S. Patent Laws "to promote the progress of science and useful arts" (Article 1, Section 8).

A semiconductor processing method of detecting polishing end point from a polishing planarization process, the method comprising the following sequential steps:

a) impinging laser light onto an area of an outermost surface of a semiconductor substrate at an angle of incidence of at least 75° from a line normal relative to the substrate, the impinged laser light predominantly reflecting off the area as opposed to transmitting therethrough;

b) measuring intensity of the step "a" light reflected off the area;

c) polishing the substrate outermost surface;

d) repeating step "a" then step "b"; and e) comparing a prior measured intensity of reflected light with a later measured intensity of reflected light to determine a change in degree of planarity of the semiconductor substrate outermost surface as a result of polishing. The invention could be conducted in situ (most preferred), or in-between polishing steps.

The invention is explained below in additional detail, first with reference to FIG. 3. There illustrated is a plot of intensity of laser light reflected off of the surface of a light transmissive silicon dioxide ($SiO_2$) layer on a semiconductor wafer as a function of varying angles of incidence taken from a line normal relative to the $SiO_2$ substrate. Accordingly, an angle of 0° with respect to the plot would correspond to impinging of laser light from a perpendicular angle relative to the wafer surface. An angle of 90° would in essence be passing light parallel to the outermost $SiO_2$ surface. Curve $R_s$ reports 100% S-polarized light, while curve $R_p$ reports 100% P-polarized light. Each was produced from a He-Ne laser operated at 10 milliwatts. Unfiltered light from such a laser is expected to produce a curve falling between the $R_s$ and $R_p$ curves.

P-polarized light was found to be essentially entirely absorbed (no measured reflected intensity) by the silicon dioxide layer at an incident angle of 56.3°, as shown. Further, significant available intensity for S-polarized light starts at an incident angle of approximately 60°, whereas incident angle for P-polarized light does not begin to rapidly increase until 75° to 80°. It is anticipated that a practical process utilizing P-polarized or non-filtered (non-polarized) light will require at least 70° incident angling from normal to achieve meaningful intensity readings for determination of wafer topography.

Numerous means of detecting the laser light reflecting off a substrate could be utilized. Specifically, one would include use of a filter/sheet having a pinhole therein and placed in front of a detector to separate specularly reflected light from non-specularly reflected light. Alternately, a position sensitive detector such as a charge-coupled device could be utilized to monitor the spatial characteristics of the reflected beam. Numerous alternate examples would also of course be useable.

Aspects in accordance with the invention, in contrast to prior art laser interferometry, will be readily apparent from viewing FIGS. 4 and 5. FIG. 4 illustrates a semiconductor wafer fragment 25 comprised of a patterned substrate 26 and overlying area of light transmissive silicon dioxide layer 28. Impinging laser light is indicated with reference numerals 30a, 30b, 30c, 30d and 30e at an incident angle of 75° relative to a line 29 which is normal relative to the general extent of the outermost wafer surface. Such incident angle is sufficiently great to cause predominant reflection of the incident laser light at the incident angle off of those portions of the outermost surface of layer 28 against which the discrete impinging angle is at 75°, such as indicated by incident rays 30a, 30c and 30e. Other incident rays, such as 30b and 30d, have a local incident angle less than 75° relative to a local normal line, and accordingly transmit through layer 28 and are absorbed or ultimately reflect from layer 26 at a significantly reduced intensity.

Figure 6:
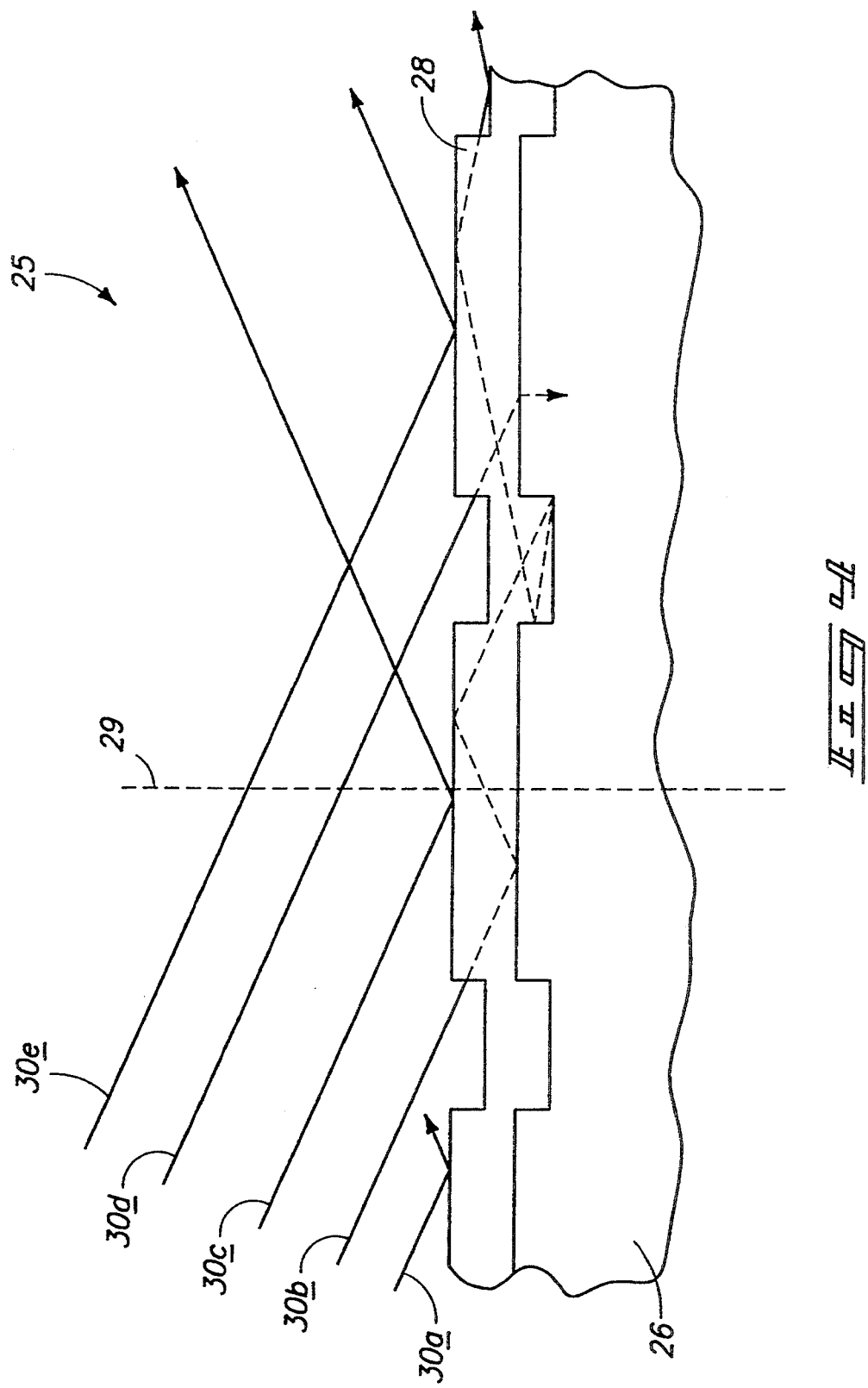
FIG. 6 is a plot of intensity as a function of time using an analysis method in accordance with the invention.
Figure 6:
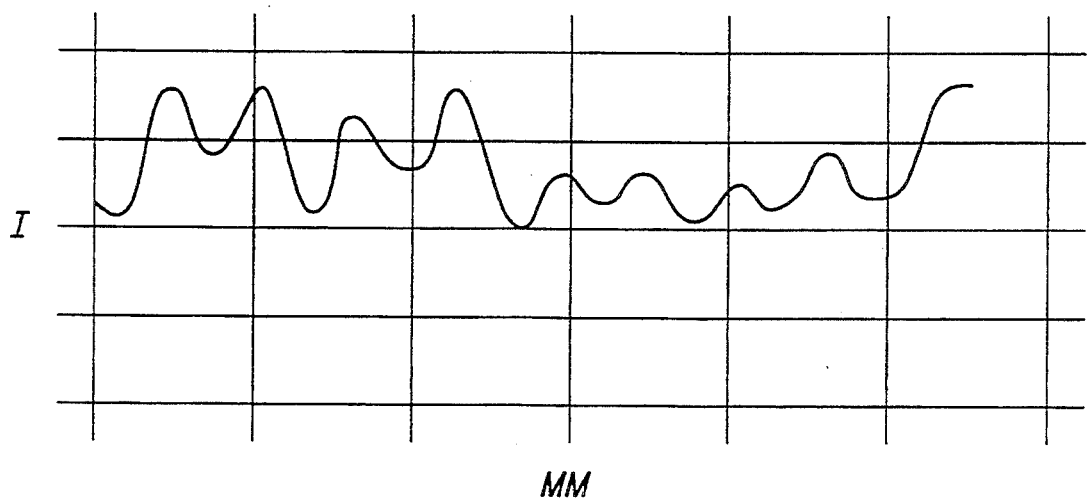

FIG. 6 illustrates an actual plot of intensity (I) of S-polarized light over a millimeters scale distance for a rotating, unpolished wafer surface, such as is diagrammatically depicted by FIG. 4. Accordingly, a signature of the intensity of reflected light as a laser is scanned over or onto a finite outermost wafer surface area at a given time is obtained. The impinging light was generated from a He-Ne laser, operated at 10 milliwatts, and at an incident angle of 75°. The plot represents approximately 30 millimeters along the x-axis.

Figure 7:
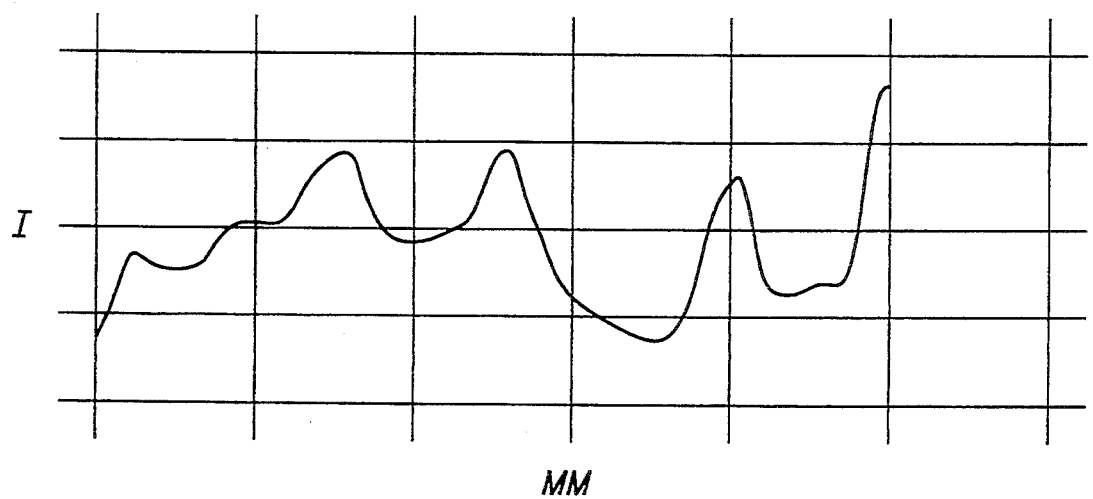
FIG. 7 is a plot of reflected intensity of laser light as a function of time, taken at a later period of time than that shown in FIG. 6 in accordance with the invention.

FIG. 5 illustrates wafer 25a after polishing of layer 28 to produce a polished, planarized outer silicon dioxide layer 28a. As is apparent, all the discrete incident light rays 35a, 35b, 35c, 35d and 35e impinge upon the particular outermost surface area at the incident angle of 75°, and are thus reflected from the outermost surface of layer 28a. Such will result in a different intensity profile, such as is shown in FIG. 7. Accordingly, a different signature or profile is obtained for wafer 25a than for wafer 25, with degree of planarity being determinable therefrom.

Preferably, the laser light will be moved over the area being analyzed at the same rate for each measurement. This will produce directly comparable signatures. If the rates are different, the frequency of the anticipated peaks of the signatures will be different. This would require more elaborate interpretation of the data to determine planarity.

To optimize the sensitivity of the measurement, the wavelength of the incident light is preferably chosen such that any light not specularly reflected from the outermost surface will be absorbed either in the outermost layer or underlying layers. However even in the absence of light absorption, an optical signature for the outermost surface of the outer layer will be obtained which is directly related to the degree of planarity. Multiple reflected rays on the unplanarized surface will have an increased chance of non-specular reflection due to, a) surfaces which are non-parallel relative to the desired outer planar surface, and b) scattering defects which occur within the outer layer and with sub-surface interfaces.

Aspects of the invention described above with reference to FIGS. 4–7 refer mostly to analysis taken of an upper layer which is substantially light transmissive. However, the invention will also be utilizable with substantially non-light transmissive, or opaque, layers. The scattering reflections of laser light in accordance with the invention off of a non-planar opaque layer will be different than the more orderly reflections of laser light off of a substantially planar layer. Accordingly, meaningful interpretations can be obtained regarding the degree of planarity for opaque layers as well, which is not possible using laser interferometry techniques of the prior art. Further, a single wavelength of light can be utilized for planarity determination, unlike the practical requirement of multiple wavelength light sources with laser interferometry.

The invention is believed to have specific principal utility for in situ monitoring of a wafer during chemical-mechanical polishing. In such a technique, a laser would be impinged upon an area of the exposed outer wafer surface during chemical-mechanical polishing, with intensity thereof being directly measured at a point in time. Seconds later, the same analysis would occur for determining a different signature, and corresponding degree of planarity of the surface being polished. Such surface analysis with the laser would continue until the intensity/time profile matched a previously determined profile of a substantially flat, planarized wafer. Such would constitute a change in a later-measured intensity of reflected light as compared to an earlier-measured intensity of reflected light, with the operator then ceasing chemical-mechanical polishing upon detection of this change.

The invention has an advantage over interferometry in that ultimate absolute light intensity is not as important. Rather, the intensity profile can be utilized as a principal comparison criteria. Specifically, laser intensity will be largely constant over the short time intervals from which an individual signature is created. However, intensity might vary considerably over the several-seconds interval between such measurements. Such could be due to changes in slurry composition, slurry quantity where the light impinges upon the wafer, or other variables. With laser interferometry, measurement of absolute intensity for each measurement is a critical factor as such is used to directly correlate to thickness. This is not a requirement with analysis in accordance with the invention. More important is the intensity profile over a short time period as opposed to absolute intensity. For example, the wave-form signatures depicted by FIGS. 6 and 7 will be substantially the same independent of the absolute intensity there depicted. Accordingly, a change in conditions which might reduce or increase intensity of received light would cause the illustrated profiles to move up or down relative to the graph, but the depicted wave-form would remain substantially identical. Thus, planarity is determinable substantially independent of absolute intensity. Further, techniques in accordance with the invention are largely insensitive to details of construction or topography of the underlying layer.

Although the invention was developed with a mindset towards use in chemical-mechanical polishing processes, it is believed that a technique in accordance with the invention would also be utilized in other polishing processes, such as strictly mechanical polishing.

Figure 8B:
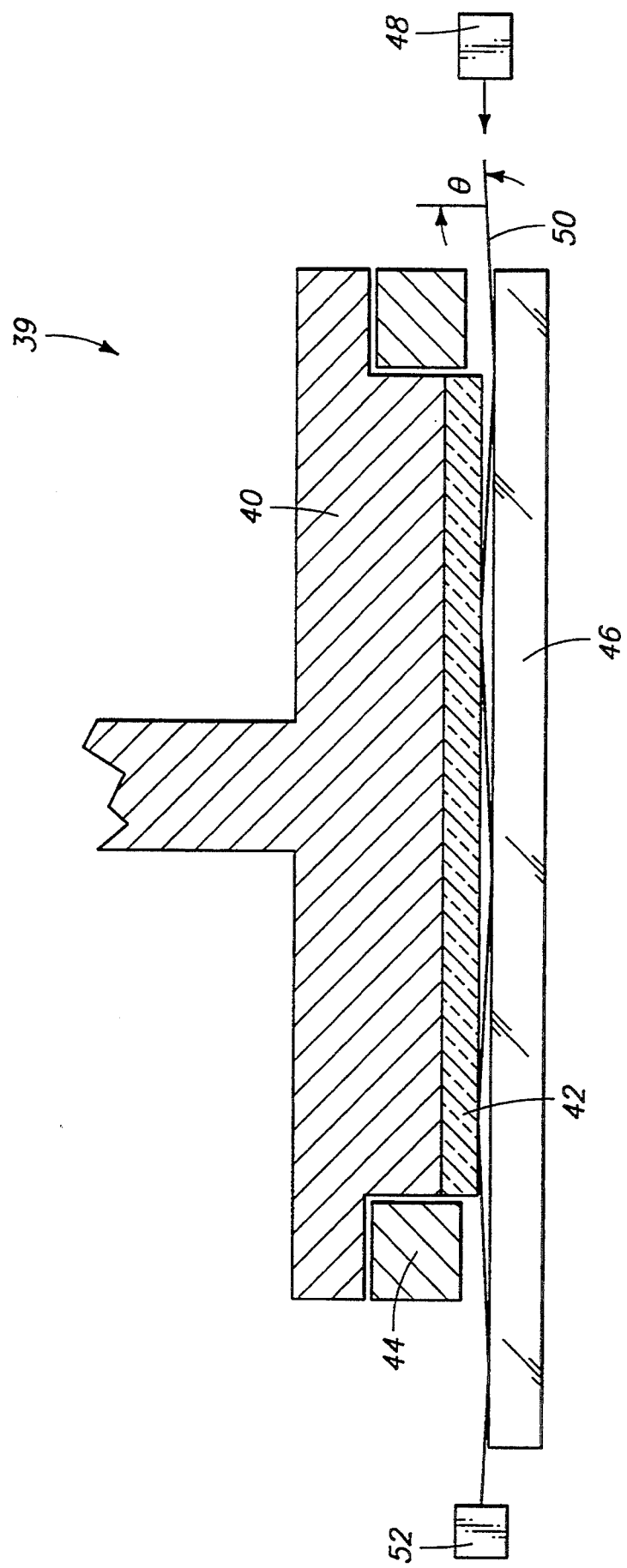
FIG. 8 is a diagrammatic side elevational view of a semiconductor wafer being processed in accordance with the invention.

In accordance with another aspect of the invention, the reflected light is preferably reflected back onto the substrate outermost surface at the angle of incidence multiple times with a mirror. The intensity of the multiple reflected light would then be monitored. Use of a mirror in this manner will maximize the sensitivity of the signal to the degree of planarization by multiply sampling the wafer surface. An example apparatus 39 for carrying out such a function is described with reference to FIG. 8. There diagrammatically shown is a wafer carrier 40 capable of retaining a semiconductor wafer substrate 42 with an annular carrier retainer ring 44. Such would rotate and bear against a rotating polishing pad (not shown) in some station outside of what is shown by FIG. 8 for polishing the outermost surface of wafer 42. At predetermined intermittent intervals, the carrier and wafer would be moved to the station as depicted by FIG. 8, wherein the carrier and wafer are brought into close proximity to a mirror 46. A laser light source 48 generates a laser beam 50 which is impinged against mirror 46 at some angle $\theta$ from normal relative to wafer surface 42. Angle $\theta$ is shown as equaling 87° from normal. Laser light 50 reflects off of mirror 46 and correspondingly onto the surface of retained wafer 42 at an incident angle of 87°. Such light 50 continues to impingingly reflect across the wafer surface and mirror 46 multiple times until engaging a suitable photodetector 52 for detecting intensity as a function of time.

An alternate apparatus 41 for use in accordance with a chemical-mechanical polishing process is described with reference to FIG. 9. Such comprises a rotating platen 60 having an axis of rotation 64. A mirror 62 is centrally positioned thereatop about axis 64. A backing plate 66 is annularly received about mirror 62 and retains an annular chemical-mechanical polishing pad 68 thereatop. An external mirror 70 is also shown positioned radially outward of rotating platen 60.

A pair of carrier arms 72, 74 rotatably supports a pair of wafers 76 and 78. Platen 60 would be caused to rotate about axis 64 and wafer carriers 72 and 74 also caused to rotate about their respective axes to rotate wafers 76 and 78 about their centers. Carriers 72 and 74 are also moveable radially relative to rotating platen 60, as is conventional in chemical-mechanical polishing processors. Carriers 72 and 74 during polishing are shown to position portions of wafers 76 and 78 outwardly and inwardly (respectively) of polishing pad 68 such that they overlie mirrors 70 and 62, respectively. Respective laser light beams are diagrammatically depicted with numerals 80 and 82, and would angle downwardly onto mirrors 70 and 62, respectively, and against the outer surfaces of wafers 76 and 78. (The rearward portion of pad 68 is not shown for clarity.) Such reflected light would be received by photodetectors (not shown) for in situ monitoring of intensity as a function of a time period during the planarizing process. Chemical-mechanical polishing could then be selectively stopped for each wafer upon detection of a substantially planar outermost surface.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A semiconductor processing method of detecting polishing end point from a polishing planarization process, the method comprising the following sequential steps:
   a) impinging laser light onto an area of an outermost surface of a semiconductor substrate at an angle of incidence of at least 75° from a line normal relative to the substrate, the impinged laser light predominantly reflecting off the area as opposed to transmitting therethrough;
   b) measuring intensity of the step "a" light reflected off of the area:
   c) polishing the substrate outermost surface:
   d) repeating step "a" then step "b"; and
   e) comparing a prior measured step "b" intensity of reflected light with a later measured step "b" intensity of reflected light to determine a change in degree of planarity of the semiconductor substrate outermost surface as a result of polishing; and
   the method further comprising reflecting the reflected light back onto the substrate outermost surface at the angle of incidence multiple times with a mirror, and wherein step "b" comprises measuring the intensity of the multiple reflected light.

2. The semiconductor processing method of detecting polishing end point of claim 1 wherein the angle of incidence is at least 80°.

3. A semiconductor processing method of detecting polishing end point in a chemical-mechanical polishing planarization process comprising the following sequential steps:
   a) chemical-mechanical polishing an outermost surface of a semiconductor substrate using a chemical-mechanical polishing pad;
   b) during such chemical-mechanical polishing, impinging laser light onto an area of the outermost surface of the semiconductor substrate at an angle of incidence of at least 75° from a line normal relative to the substrate, the impinged laser light predominantly reflecting off the area as opposed to transmitting therethrough;
   c) during such chemical-mechanical polishing, measuring intensity of the step "b" light reflected off of the area;
   d) repeating step "b" then step "c"; and
   e) detecting a change in a later measured intensity of reflected light as compared to an earlier measured intensity of reflected light as the surface being chemical-mechanical polished becomes substantially planar; and
   f) ceasing chemical-mechanical polishing upon detection of the change; and
   the method further comprising reflecting the reflected light back onto the substrate outermost surface at the angle of incidence multiple times with a mirror, and wherein step "c" comprises measuring the intensity of the multiple reflected light.

4. The semiconductor processing method of detecting polishing end point of claim 3 wherein the angle of incidence is at least 80°.

5. A semiconductor processing method of detecting polishing end point from a polishing planarization process, the method comprising the following sequential steps:
   a) impinging s-polarized laser light onto an area of an outermost surface of a semiconductor substrate at an angle of incidence of at least 60° from a line normal relative to the substrate, the impinged s-polarized laser light predominantly reflecting off the area as opposed to transmitting therethrough;
   b) measuring intensity .of the step "a" s-polarized light reflected off the area;
   c) polishing the substrate outermost surface;
   d) repeating step "a" then step "b"; and
   e) comparing a prior measured intensity of s-polarized reflected light with a later measured intensity of s-polarized reflected light to determine a change in degree of planarity of the semiconductor substrate outermost surface as a result of polishing; and
   f) the method further comprising reflecting the reflected light back onto the substrate outermost surface at the angle of incidence multiple times with a mirror, and wherein step "b" comprises measuring the intensity of the multiple reflected light.

6. The semiconductor processing method of detecting polishing end point of claim 5 wherein the angle of incidence is at least 80°.

7. A semiconductor processing method of detecting polishing end point in a chemical-mechanical polishing planarization process comprising the following sequential steps:
   a) chemical-mechanical polishing an outermost surface of a semiconductor substrate using a chemical-mechanical polishing pad;
   b) during such chemical-mechanical polishing, impinging s-polarized laser light onto an area of the outermost surface of the semiconductor substrate at an angle of incidence of at least 60° from a line normal relative to the substrate, the impinged laser light predominantly reflecting off the area as opposed to transmitting therethrough;
   c) during such chemical-mechanical polishing, measuring intensity of the step "b" s-polarized light reflected off of the area;
   d) repeating step "b" then step "c"; and
   e) detecting a change in a later measured intensity of s-polarized reflected light as compared to an earlier measured intensity of s-polarized reflected light as the surface being chemical-mechanical polished becomes substantially planar; and f) ceasing chemical-mechanical polishing upon detection of the change; and the method further comprising reflecting the reflected light back onto the substrate outermost surface at the angle of incidence multiple times with a mirror, and wherein step "c" comprises measuring the intensity of the multiple reflected light.

8. The semiconductor processing method of detecting polishing end point of claim 7 wherein the angle of incidence is at least 80°.

* * * * *